UNITED STATES PATENT OFFICE.

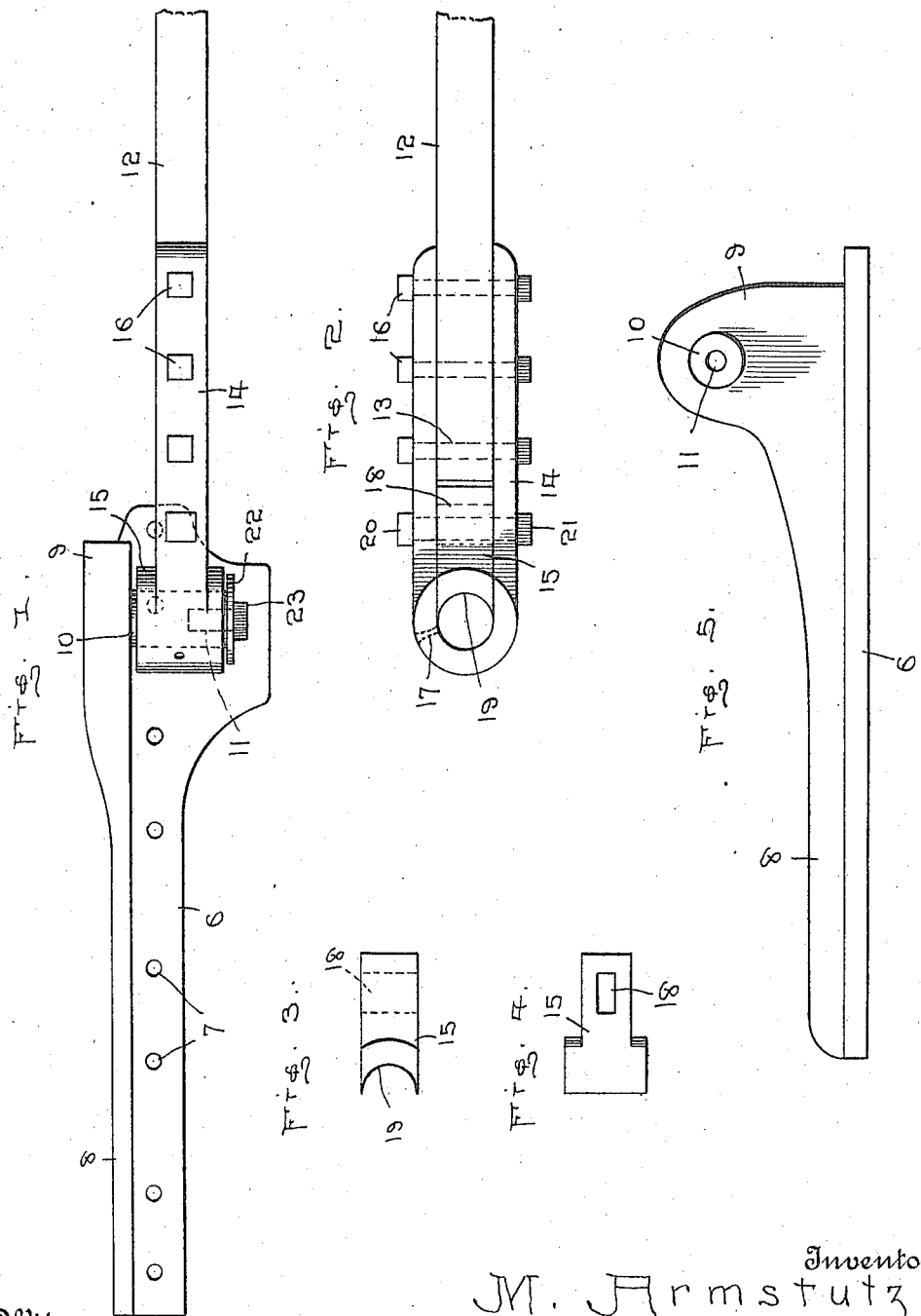

MICHAEL ARMSTUTZ, OF HECKER, ILLINOIS.

CONNECTING-ROD FOR MOWING-MACHINES.

1,181,822.   Specification of Letters Patent.   Patented May 2, 1916.

Application filed February 12, 1914. Serial No. 818,226.

*To all whom it may concern:*

Be it known that I, MICHAEL ARMSTUTZ, a citizen of the United States, residing at Hecker, in the county of Monroe and State of Illinois, have invented certain new and useful Improvements in Connecting-Rods for Mowing-Machines; and I do hereby declare the following to be a full, clear, and exact description of the invention, such as will enable others skilled in the art to which it appertains to make and use the same.

The object of this invention is the provision of a device primarily adapted to compensate for the wear between the driving pitman and the knife bar of a mowing machine, but it is not necessarily limited to such use.

Another object is the provision of a device of this character, which shall be simple and convenient to adjust and efficient in operation.

With these and other objects in view, the invention consists of a novel construction, combination, formation and arrangement of parts which will hereinafter be fully described and claimed.

In the accompanying drawing, wherein is shown an approved and practical embodiment of the invention, Figure 1 represents a top plan view of my improved compensating device applied to a mowing machine. Fig. 2 represents a side elevation of the head and adjacent portion of the pitman. Fig. 3 represents a side elevation of the compensating block removed. Fig. 4 represents a top plan view thereof, and Fig. 5 represents a side elevation of the plate adapted for attachment to the knife bar of the mowing machine.

Referring to the drawing in detail, 6 indicates a plate adapted to be secured to the knife bar (not shown) of a mowing machine by suitable bolts extending through the openings 7 formed in said plate. The rear edge of the plate 6 is formed with an upstanding flange 8, terminating at its inner end in an enlargement 9 carrying the forwardly projecting horizontally disposed pin 10 having a threaded recess 11 in its forward end.

The pitman 12 is connected in the usual manner to the crank (not shown) of the mowing machine and is formed adjacent its opposite end with a series of spaced apertures 13. The pitman head consists of a stationary part 14 and a movable part or block 15. The stationary part 14 is substantially U-shaped and is secured by the parallel ends to the pitman 12 by bolts 16 extending through the apertures 13. The curved portion of the part 14 of the head is enlarged laterally to provide a greater bearing surface, as will be hereinafter more clearly understood, and is spaced a sufficient distance from the end of the pitman 12 to provide adequate longitudinal adjustment of the block 15. A suitable lubricating opening 17 is formed through the curved or central portion of the stationary part 14.

The adjustable block 15 is formed with an opening 18 extending transversely therethrough and elongated longitudinally thereof. The end face 19 of the block is curved in conformity with the adjacent concave face at the medial portion of the stationary part 14 so that, when the parts 14 and 15 are properly adjusted, an opening of proper size is provided to receive the pin 10. The elongated opening 18 receives a bolt 20 positioned through the adjacent parallel portions of the stationary part 14, and a suitable nut 21 is threaded on said bolt for securing the parts in adjusted position.

A washer 22 is held against the end of the pin 10 by a bolt 23 and is adapted to secure the pitman head in operative position upon the pin 10.

The stationary part 14 of the head is preferably formed of springy or slightly resilient material, whereby when the nut 21 is unscrewed from the bolt 20, the parallel parts will spring outwardly and free the block 15, permitting the same to be conveniently adjusted to compensate for the wear between the head and the pin 10. The portion of the bolt 20 extending through the elongated opening 18 is preferably square in cross section and snugly fits between the side walls of said opening, whereby relative rotation of the parts 14 and 15 is prevented.

What I claim is:

A pitman construction comprising the combination with a plate having an upstanding flange along one edge thereof and a horizontally disposed pin integral with said flange and extended over said plate at right angles to said flange, of a pitman head consisting of a substantially U-shaped member, the curved end portion of which is extended laterally beyond the edges of the remaining portion of said member, said U-shaped member being formed of slightly resilient material, a block slidable between the arms of said member having one end concaved and extended laterally to conform to the lateral extension of the U-shaped member, said block having an elongated vertical opening, a bolt of square formation in cross section extending through the U-shaped member and the opening in the block and adapted to clamp the arms of said U-shaped member against the block to hold the block in adjusted position and against swinging movement, said bolt being normally spaced from the end walls of the opening and engaging the side walls thereof, a washer of greater diameter than the diameter of the opening in the pitman head, a bolt entering the end of said pin and extending through the washer, a pitman, and means to secure the U-shaped member to the pitman.

In testimony whereof I have signed my name to this specification in the presence of two subscribing witnesses.

MICHAEL ARMSTUTZ.

Witnesses:
JULIUS RAUSCH,
GEORGE NEFF.

Copies of this patent may be obtained for five cents each, by addressing the "Commissioner of Patents, Washington, D. C."